United States Patent
Shoji et al.

(10) Patent No.: US 7,149,204 B2
(45) Date of Patent: Dec. 12, 2006

(54) BASE STATION DEVICE AND CHANNEL ASSIGNING METHOD

(75) Inventors: Takahiro Shoji, Yokohama (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 849 days.

(21) Appl. No.: 10/069,008

(22) PCT Filed: Jun. 20, 2001

(86) PCT No.: PCT/JP01/05228

§ 371 (c)(1),
(2), (4) Date: Feb. 20, 2002

(87) PCT Pub. No.: WO01/99452

PCT Pub. Date: Jun. 20, 2001

(65) Prior Publication Data

US 2002/0196758 A1    Dec. 26, 2002

(51) Int. Cl.
*H04B 7/212* (2006.01)
*H04J 3/00* (2006.01)

(52) U.S. Cl. .............. 370/337; 370/347; 370/444
(58) Field of Classification Search ............. 370/252, 370/337, 342, 347
See application file for complete search history.

(56) References Cited

U.S. PATENT DOCUMENTS

| | | | |
|---|---|---|---|
| 5,491,837 A * | 2/1996 | Haartsen | 455/450 |
| 5,666,654 A * | 9/1997 | Kanai | 455/450 |
| 5,898,927 A * | 4/1999 | Ishii et al. | 455/450 |
| 6,041,238 A | 3/2000 | Tanoue | |
| 6,356,540 B1 | 3/2002 | Kojiro | |
| 6,373,830 B1 * | 4/2002 | Ozluturk | 370/335 |

FOREIGN PATENT DOCUMENTS

| | | | |
|---|---|---|---|
| JP | 07245778 | | 9/1995 |
| JP | 09187065 | | 7/1997 |
| JP | 10022975 | | 1/1998 |
| JP | 11075248 | | 3/1999 |
| JP | 11205848 | | 7/1999 |
| JP | 11261518 | | 9/1999 |
| JP | 2002-004473 | * | 1/2000 |
| JP | 2000004473 | | 1/2000 |
| JP | 2000-184434 | * | 6/2000 |
| JP | 2000184434 | | 6/2000 |
| WO | 9914869 | | 3/1999 |

(Continued)

OTHER PUBLICATIONS

M. Nohara et al.; "A Carrier Assignment Control In Satellite Communications based on Demand Assignment/FDMA System", Denshi Tsuushin Gakkai Gijutsu Kenkyu Houkoku, vol. 85, No. 169, 1985, pp. 1-8, with English translation.*

(Continued)

*Primary Examiner*—Brian Nguyen
(74) *Attorney, Agent, or Firm*—Stevens, Davis, Miller & Mosher, LLP

(57) ABSTRACT

Priority order storage section 113 stores the order of priority for an uplink and the reverse order of priority for a downlink. Channel allocation section 114 performs channel allocation for a downlink in the order of priority of the downlink stored in priority order storage section 113, based on the CIR of the downlink. In addition, channel allocation section 114 performs channel allocation for an uplink in the order of priority of the uplink stored in priority order storage section 113, based on the CIR of the uplink. It is thereby possible to perform reuse partitioning in asymmetrical data communications.

2 Claims, 10 Drawing Sheets

FOREIGN PATENT DOCUMENTS

WO        9944313        9/1999

OTHER PUBLICATIONS

L. Chen, et al.; "A Study on an Adaptive Dynamic Channel Assignment Algorithm for Asymmetric Traffic", Denshi Joho Tsuushin Gakkai, 1997nen Tsuushin Society Taikai Kouen Ronbunshu 1, 1997, p. 291, B-5-38 with English translation.

T. Kanai: "Autonomous Reuse Partioning in Micro-Cellular Systems", NEC Corporation, C&C Systems Research Laboratories, RCS91-32, pp. 23-28, with English translation.

S. W. Halpern; "Reuse Partitioning In Cellular Systems", pp. 322-327.

M. Lindstrom, et al.; "Dynamic Link Asymmetry In 'Bunched' Wireless Networks," VTC 1999-Fall. IEEE VTS 50TH. Vehicular Technology Conference. Gateway to the 21st. Century Communications Village. Amsterdam, Sep. 19-22, 1999, IEEE Vehicular Technology Conference, New York, NY: IEEE, US, vol. 1 Conf. 50, XP000929070 ISBN: 0-7803-5436-2, pp. 352-356.

H. Holma, et al.; "Evaluation of Interference Between Uplink And Downlink In UTRA/TDD," Vehicular Technology Conference, 1999. VTC 1999-Fall. IEEE VTS 50th Amsterdam, Netherlands Sep. 19-22, 1999, Piscataway, NJ, USA, IEEE, US Sep. 19, 1999, pp. 2616-2620, XP010353331 ISBN: 0-7803-5435-4.

N. C. Ericsson; "Adaptive Modulation And Scheduling For Fading Channels," Global Telecommunications Conference Globecom 99, XP010373434, pp. 2668-2672.

M. Nohara et al,; "A Carrier Assignment Control In Satellite Communications based on Demand Assignment/FDMA System", Denshi Tsuushin Gakkai Gijutsu Kenkyu Houkoku, vol. 85, No. 169, 1985, pp. 1-8, with English translation.

* cited by examiner

| SLOT NUMBER | #0 | #1 | #2 | #3 | #4 | #5 | #6 | #7 | #8 | #9 | #10 | #11 | #12 | #13 | #14 |
|---|---|---|---|---|---|---|---|---|---|---|---|---|---|---|---|
| UPLINK ORDER OF PRIORITY | 1 | 2 | 3 | 4 | 5 | 6 | 7 | 8 | 9 | 10 | 11 | 12 | 13 | 14 | 15 |
| DOWNLINK ORDER OF PRIORITY | 15 | 14 | 13 | 12 | 11 | 10 | 9 | 8 | 7 | 6 | 5 | 4 | 3 | 2 | 1 |

FIG.6

| SLOT NUMBER | #0 | #1 | #2 | #3 | #4 | #5 | #6 | #7 | #8 | #9 | #10 | #11 | #12 | #13 | #14 |
|---|---|---|---|---|---|---|---|---|---|---|---|---|---|---|---|
| UPLINK ORDER OF PRIORITY | 8 | 9 | 10 | 11 | 12 | 13 | 14 | — | 1 | 2 | 3 | 4 | 5 | 6 | 7 |
| DOWNLINK ORDER OF PRIORITY | 7 | 6 | 5 | 4 | 3 | 2 | 1 | — | 14 | 13 | 12 | 11 | 10 | 9 | 8 |

FIG.9

BASE STATION DEVICE AND CHANNEL ASSIGNING METHOD

TECHNICAL FIELD

The present invention relates to a base station apparatus and channel allocation method in a cellular system, wherein the respective channels are allocated to either an uplink or a downlink.

BACKGROUND ART

As illustrated in FIG. 1, generally, the entire service area is divided into a plurality of cells, and one base station apparatus is installed for each cell in a mobile communication system. Then, the respective cellular station apparatuses perform wireless communication with their own base station apparatuses, to which they belong.

In the case of FIG. 1, since cellular station apparatus 31 and 32 belong to cell 11, they perform wireless communication with base station apparatus 21 installed in cell 11. Similarly, since cellular station apparatus 33 belongs to cell 12, it performs wireless communication with base station apparatus 22 installed in cell 12.

Here, respective cellular station apparatuses transmit uplink signals and receive downlink signals using the channel allocated by their base station apparatuses. A plurality of channel allocation methods of a mobile communication system using this cellular system has been previously proposed.

One of the channel allocation methods is described in Toshihito Kanai: "Autonomous Reuse Partitioning Dynamic Channel Allocation Method in Micro Cell Mobile Communication System (ARP)," The Technical Report of IEICE, RCS91-32 (1991). With this Autonomous Reuse Partitioning (ARP) system, a channel is selected with the same order of priority in all cells, and among the selected channels, the one with a CIR (Carrier to Interference Ratio) exceeding the predetermined threshold is used sequentially.

Channel allocation in the conventional ARP system is next explained using the flowchart illustrated in FIG. 2.

First, when there is a call request at Step (hereinafter referred to as "ST") 51, the base station apparatus measures the desired wave level of the uplink, and the cellular station apparatus measures the desired wave level of the downlink at ST52.

Then, at ST 53, the base station apparatus selects the available channel with the highest priority according to the common order of priority for all base station apparatuses. An available channel denotes an unused slot in the case of the TDMA system, and in the case of the CDMA/TDD system it denotes an unallocated slot or a slot wherein uplink/downlink to be allocated is matched and that has available code resource.

Next, at ST54, the base station apparatus measures the interference wave level of the uplink for the selected channel, and the cellular station apparatus measures the interference wave level of the downlink.

Then at ST55, the base station apparatus compares the uplink/downlink CIR of the selected channel with a predetermined threshold (the so-called channel search.) If the uplink CIR and downlink CIR exceed the threshold, the base station apparatus will allocate a call to the selected channel at ST 56. However, if either uplink CIR or downlink CIR are below the threshold, the base station apparatus will determine whether or not available channels are unchecked with the channel search (hereinafter, referred to as "non-searched channel") at ST 57.

If non-searched channels still remain, the base station apparatus and cellular station apparatus repeat the processes following ST 53, excluding the channels completed for a channel search. Meanwhile, if non-searched channels do not remain, the base station apparatus will complete the processing as call loss at ST59.

With ARP channel allocation, it is possible to perform the so-called reuse partitioning (Halpern:"Reuse Partitioning in Cellular Systems," Proc. of VTC '83, pp. 322–327 (1983)) in each cell in an autonomous, spreading manner, wherein the optimal cell reuse factor can be set for each channel depending on the distance from the cellular station apparatus to the base station apparatus, that is, the size of the loss of the transmission path.

Furthermore, by performing reuse partitioning and setting the optimal cell reuse factor, the system is capable of accommodating more calls as a whole.

With this conventional ARP system, it is assumed that the number of channels for an uplink and downlink is fixed at the same number and that a pair of uplink channel and downlink channel is fixed. Therefore, uplink/downlink to be allocated to each channel is common to all cells. For example, in FIG. 1 above, cellular station apparatus 33 does not transmit signals in the channel where cellular station apparatus 31 receives signals. Thus, a cellular station apparatus is not disrupted by signals transmitted from the cellular station apparatus that belongs to another cell.

However, it is expected that asymmetrical data communications, wherein the information volume of the downlink is significantly larger than that of the uplink, will be common place in the future. With this asymmetrical data communication, each channel is allocated to an uplink or downlink in a flexible manner. Namely, it is necessary to change the number of channels allocated to the uplink and downlink from the predetermined number of channels.

However, if the conventional ARP channel allocation method were applied to asymmetrical data communication and channel allocation were performed in the same order of priority for an uplink and downlink, the uplink/downlink to be allocated to each channel would likely differ depending on the cell. In this condition, a cellular station apparatus would be disrupted by signals transmitted from the cellular station apparatus belonging to another cell, and it would therefore be impossible to perform reuse partitioning.

DISCLOSURE OF INVENTION

It is an object of the present invention to provide a base station apparatus and channel allocation method for performing reuse partitioning in asymmetrical data communications, and for determining the number of channels of the uplink/downlink in a flexible manner.

The present invention achieves the above object by performing channel allocation for an uplink and downlink individually, according to an order of priority that is common to all base station apparatuses and that is reversed between an uplink and a downlink.

BRIEF DESCRIPTION OF DRAWINGS

FIG. 6 is a diagram illustrating one example of the order of priority of the uplink and downlink according to the first embodiment of the present invention;

FIG. 9 is a diagram illustrating one example of the order of priority of the uplink and downlink, according to the second embodiment of the present invention.

BEST MODE FOR CARRYING OUT THE INVENTION

Embodiments of the present invention will be described specifically below with reference to accompanying drawings.

(First Embodiment)

Figure 1:
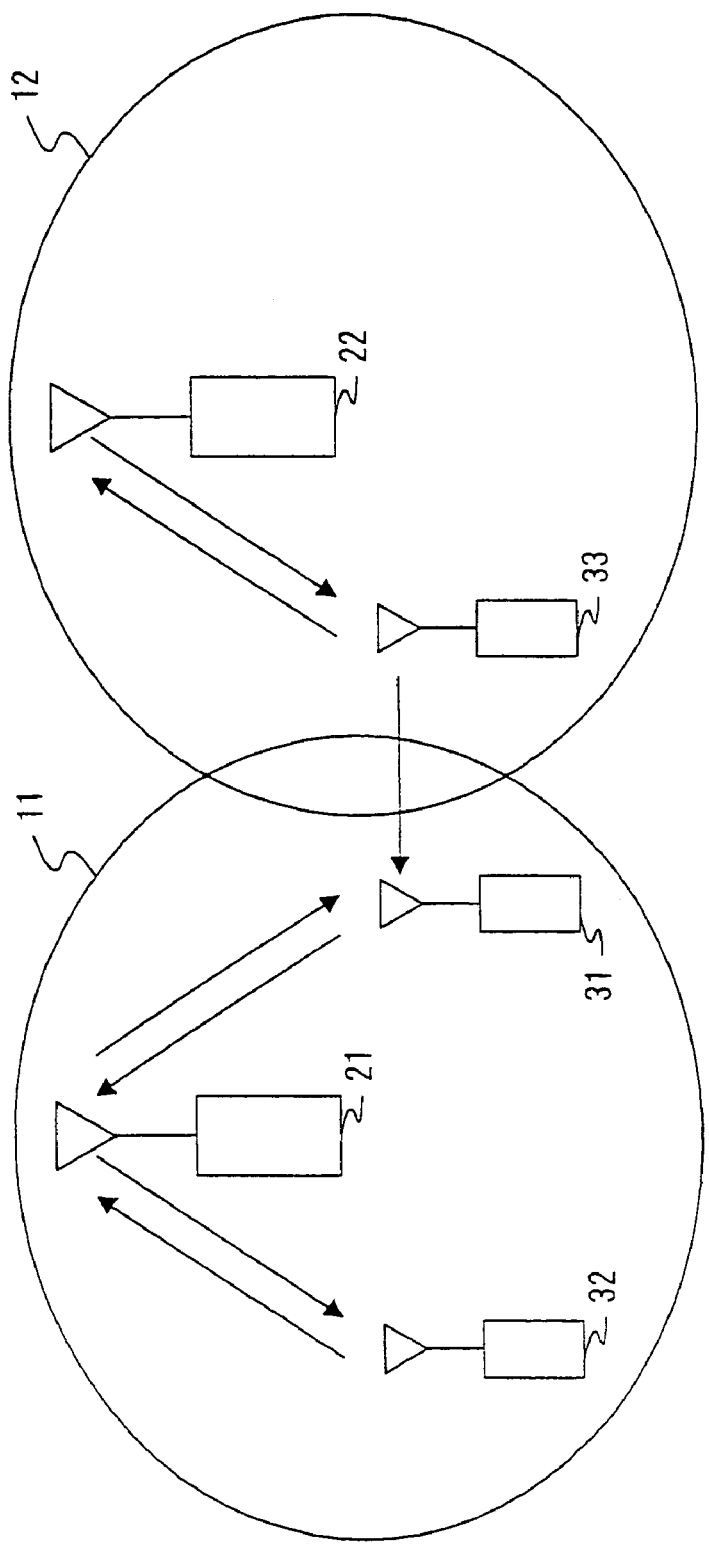
FIG. 1 is a diagram illustrating a configuration of a mobile communication system.
Figure 2:
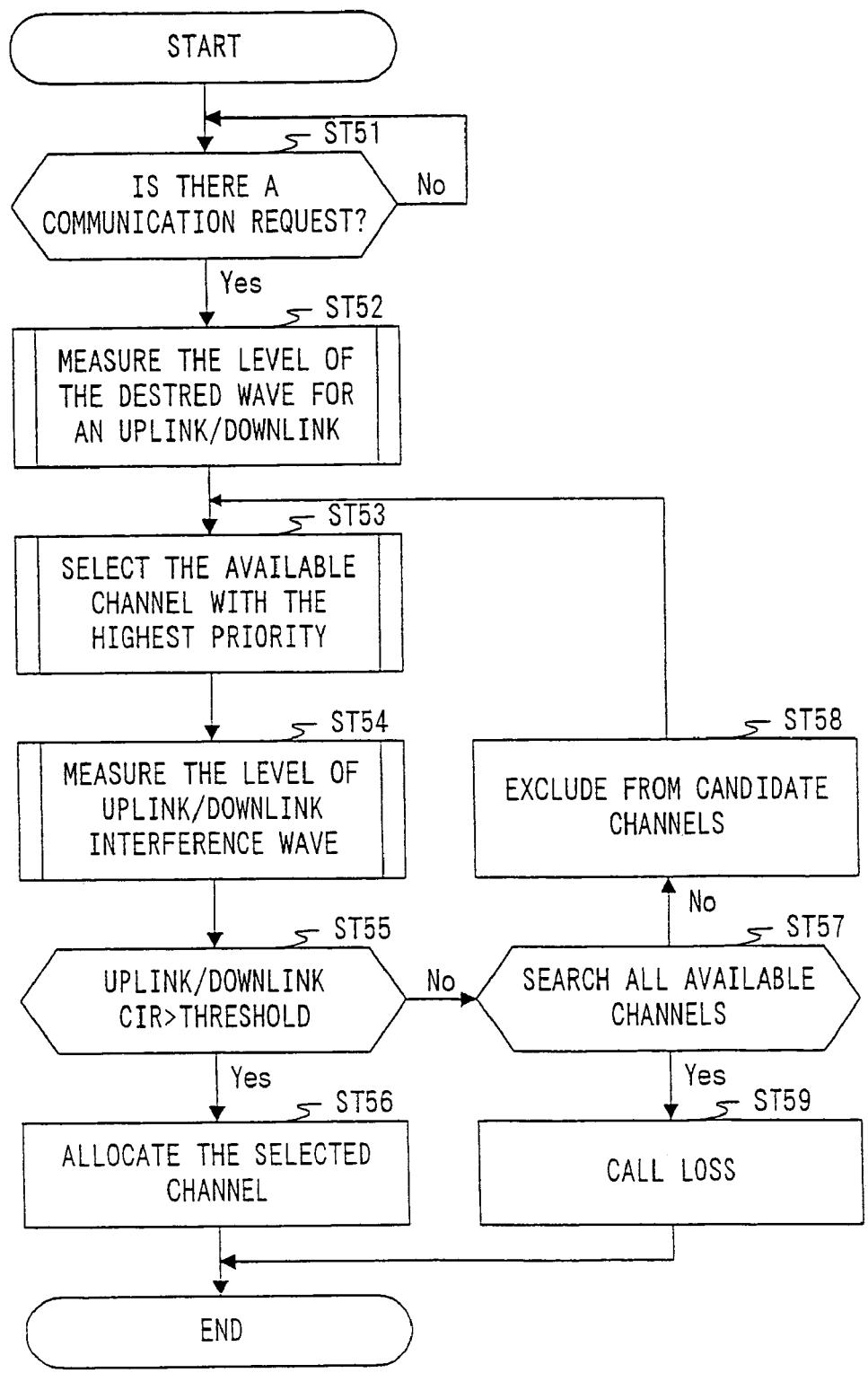
FIG. 2 is a flowchart to explain the conventional channel allocation operation.
Figure 3:
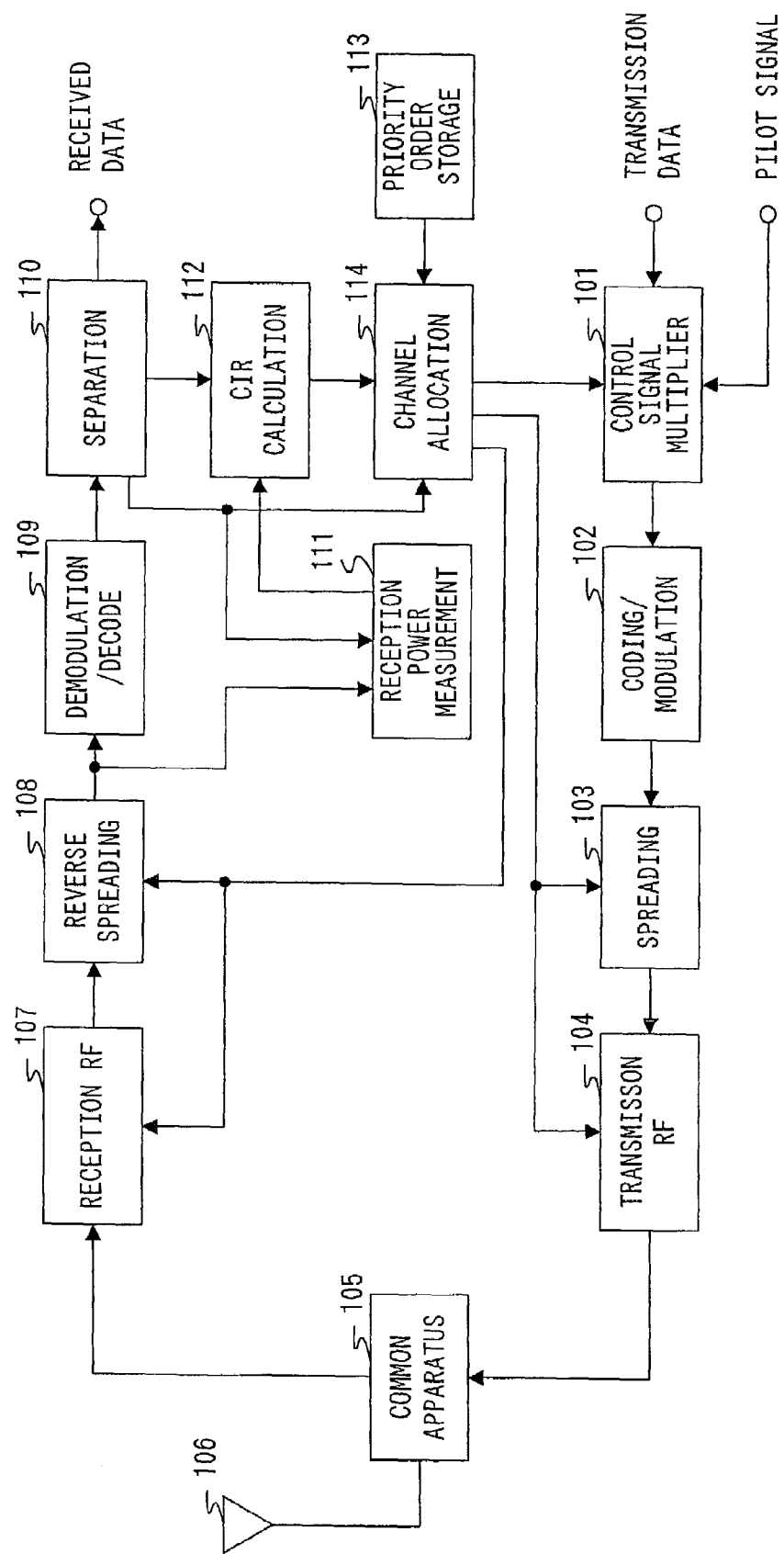
FIG. 3 is a block diagram illustrating a schematic configuration of the base station apparatus according to the first embodiment of the present invention.
Figure 4:
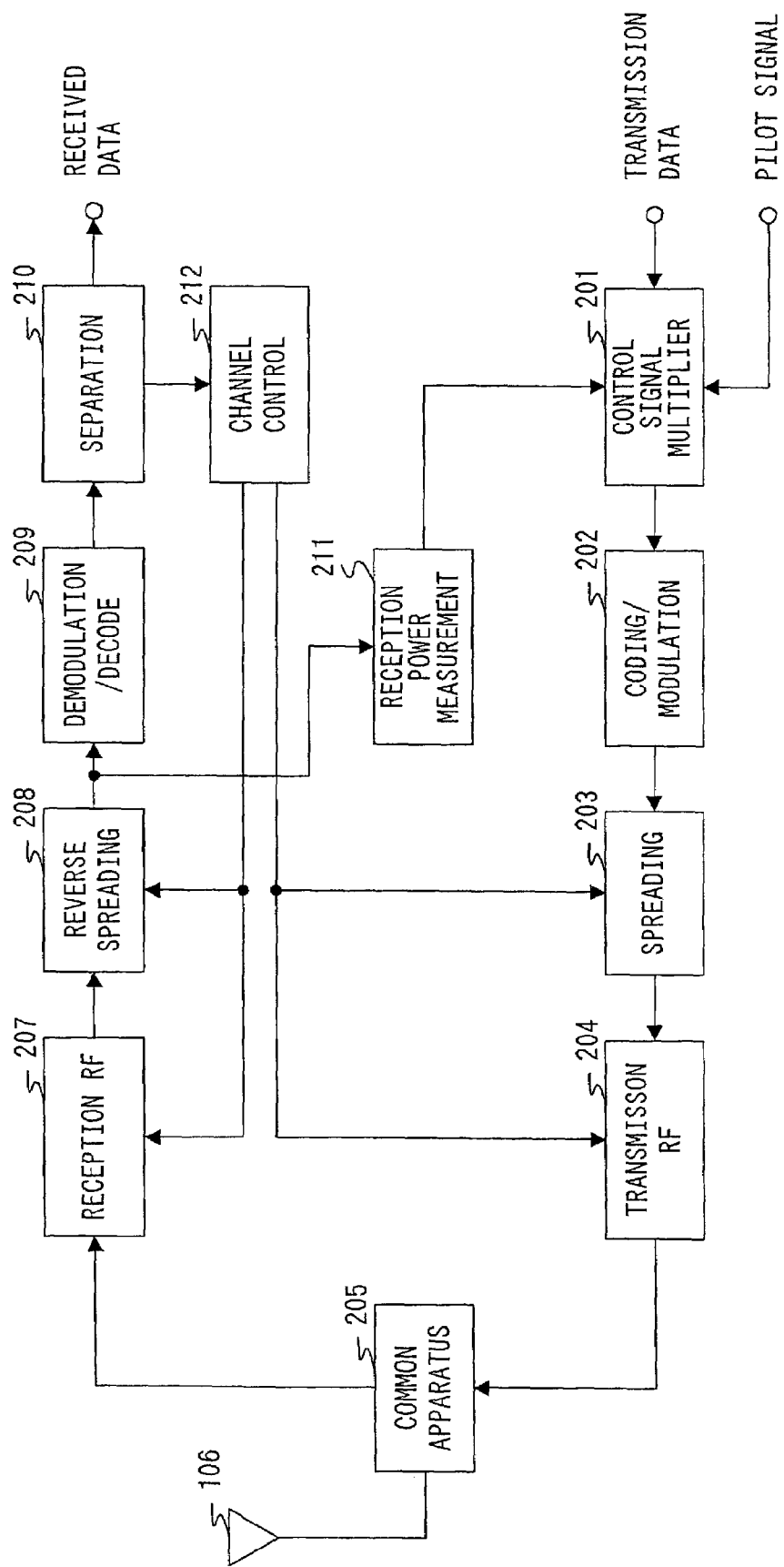
FIG. 4 is a block diagram illustrating a schematic configuration of the cellular station apparatus performing wireless communication with the base station apparatus, according to the first embodiment of the present invention.

FIG. 3 is a block diagram illustrating a schematic configuration of the base station apparatus according to the first embodiment of the present invention. FIG. 4 is a block diagram illustrating a schematic configuration of the cellular station apparatus performing wireless communication with the base station apparatus of FIG. 3.

In addition, the base station apparatus illustrated in FIG. 3 and the cellular station apparatus illustrated in FIG. 4 apply to a mobile communication system using a CDMA/TDD system. With a CDMA/TDD system, the wireless communication link channel is specified by time slots and code.

In the base station apparatus illustrated in FIG. 3, control signal multiplier 101 multiplies the transmission data by control signals, such as pilot signals and channel allocation information. Channel allocation information shows to which time slot and code a local station call channel are allocated.

Coding/modulation section 102 performs the predetermined coding and modulation processing on output signals of control signal multiplier 101. Spreading section 103 performs spreading processing on output signals of coding/modulation section 102, using the spreading signal specified in the instruction from the channel allocation section 114.

Transmission RF section 104 performs the predetermined wireless processing on output signals of spreading section 103 in the time slot specified in the instruction from the channel allocation section 114.

Common apparatus 105 switches over from transmission to reception or vice versa to perform wireless communication using the same antenna. It wirelessly transmits output signals of transmission RF section 104 from antenna 106, and outputs the signals received at antenna 106 to reception RF section 107.

Reception RF section 107 performs the predetermined wireless processing on output signals of common apparatus 105 in the time slot specified in the instruction from the channel allocation section 114.

Reverse spreading section 108 performs reverse spreading processing on output signals of reception RF section 107 using the spreading code specified in the instruction from the channel allocation section 114, and separates a desired wave from an interference wave. Demodulation/decode section 109 performs demodulation processing and decode processing on output signals of reverse spreading section 108.

Separation section 110 separates control signals and received data from output signals of demodulation/decode section 109, and outputs information about the reception power of the desired wave of the downlink and the reception power of the interference wave of the designated time slot, which are included in control signals, to CIR calculation section 112. In addition, if a control signal includes information about a communication request, separation section 110 will notify reception power measurement section 111 and channel allocation section 114 of said information.

Reception power measurement section 111 measures the reception power of the desired wave and the reception power of the interference wave of the designated time slot, and outputs the measurement results to CIR calculation section 112.

CIR calculation section 112 calculates the CIR of a downlink based on information about the reception power of the desired wave and interference wave output from separation section 110, and calculates the CIR of an uplink based on the respective reception power of the desired wave and interference wave, which is measured at reception power measurement section 111.

Priority order storage section 113 stores the order of priority of the slots to be checked with channel research for an uplink and downlink respectively. The detailed relationship between the order of priority of the uplink and that of the downlink will be described below.

Channel allocation section 114 performs channel allocation for the downlink based on the CIR of the downlink, according to the order of priority of the downlink stored in priority order storage section 113. Also, channel allocation section 114 performs channel allocation for the uplink based on the CIR of the uplink, according to the order of priority of the uplink stored in priority order storage section 113.

Also, channel allocation section 114 controls spreading section 103 and transmission RF section 104 according to the results of the channel allocation of the downlink, and controls reception RF section 107 and reverse spreading section 108 according to the results of the channel allocation of the uplink. In addition, channel allocation section 114 outputs channel allocation information to control signal multiplier 101. The channel allocation operation will be described in detail below.

Meanwhile, in the cellular station apparatus illustrated in FIG. 4, control signal multiplier 201 multiplies the transmission data by control signals. Control signals to be multiplied by control signal multiplier 201 include pilot signals, the reception power of the desired wave of the downlink, the reception power of the interference wave of the designated time slot or information about the call request.

Coding/modulation section 202 performs the predetermined coding processing and modulation processing on output signals of control signal multiplier 201. Spreading section 203 performs spreading processing on output signals of coding/modulation section 202, using the spreading code specified in the instruction from the channel control section 212.

Transmission RF section 204 performs the predetermined wireless processing on output signals of spreading section 203 in the time slot specified in the instruction from the channel control section 212.

Common apparatus 205 changes over from transmission to reception or vice versa to perform wireless communication using the same antenna. It wirelessly transmits output signals of the transmission RF section 204 from antenna 206, and outputs the signals received at antenna 206 to reception RF section 207.

Reception RF section 207 performs the predetermined wireless processing on output signals of common apparatus 205 in the time slot specified in the instruction from the channel control section 212.

Reverse spreading section 208 performs reverse spreading processing on output signals of reception RF section 207, using the spreading code specified in the instruction from the channel control section 212, and separates the desired waves from the interference waves.

Demodulation/decode section 209 performs demodulation processing and decode processing on the output signals of reverse spreading section 208. Separation section 210 separates the control signals and received data from the output signals of demodulation/decode section 209, and outputs the channel allocation information included in control signals to channel control section 212.

Reception power measurement section 211 measures the respective reception power of the desired wave and the interference wave separated at reverse spreading section 208, and outputs the measurement results to control signal multiplier 201.

Channel control section 212 controls spreading section 203, transmission RF section 204, reception RF section 207 and reverse spreading section 208 based on channel allocation information.

Figure 5:
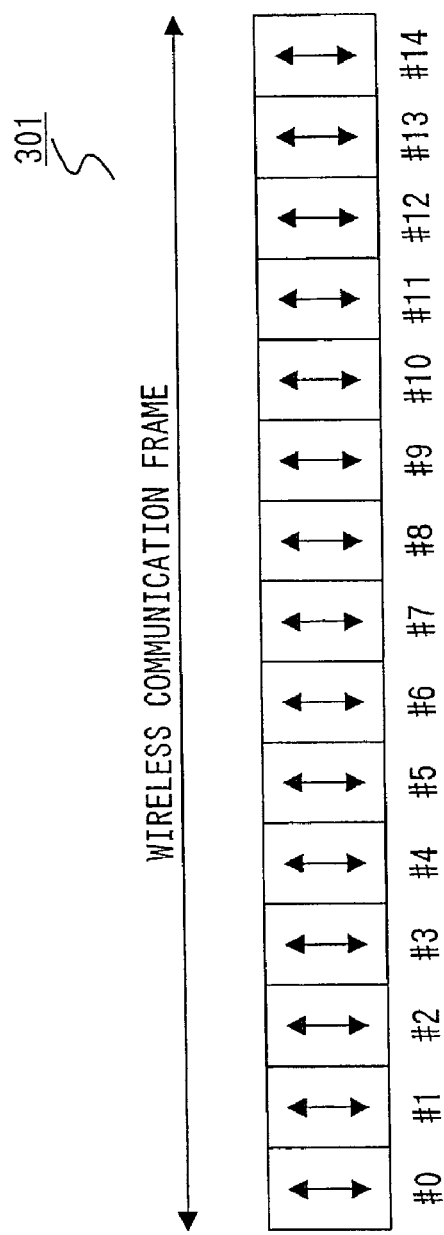
FIG. 5 is a diagram to explain a frame configuration of asymmetrical data communication according to the first embodiment of the present invention.

The relationship between the order of priority of the uplink and that of the downlink will be next explained using FIG. 5 and FIG. 6 according to the embodiments of the present invention.

FIG. 5 is a diagram to explain a frame configuration of asymmetrical data communication according to the embodiments of the present invention. In FIG. 5, wireless frame 301 is divided into time slot #0 to #14. In the case of asymmetrical data communication, it should be possible to perform an allocation for either an uplink or a downlink in each time slot.

Therefore, it is necessary to set an order of priority for a channel search for all time slots in an uplink and a downlink. FIG. 6 shows an example of an order of priority of the uplink and downlink according to the embodiments of the present invention.

As illustrated in FIG. 6, the order of priority of the uplink is opposite to the order of priority of the downlink, according to the embodiments of the present invention. Namely, with the order of priority of the uplink, time slot #0 with the smallest slot number has the highest priority, and as the slot number increases, the priority becomes lower. In contrast, with the order of priority of the downlink, time slot #14 with the largest slot number has the highest priority, and as the slot number decreases, the priority becomes lower.

Figure 7:
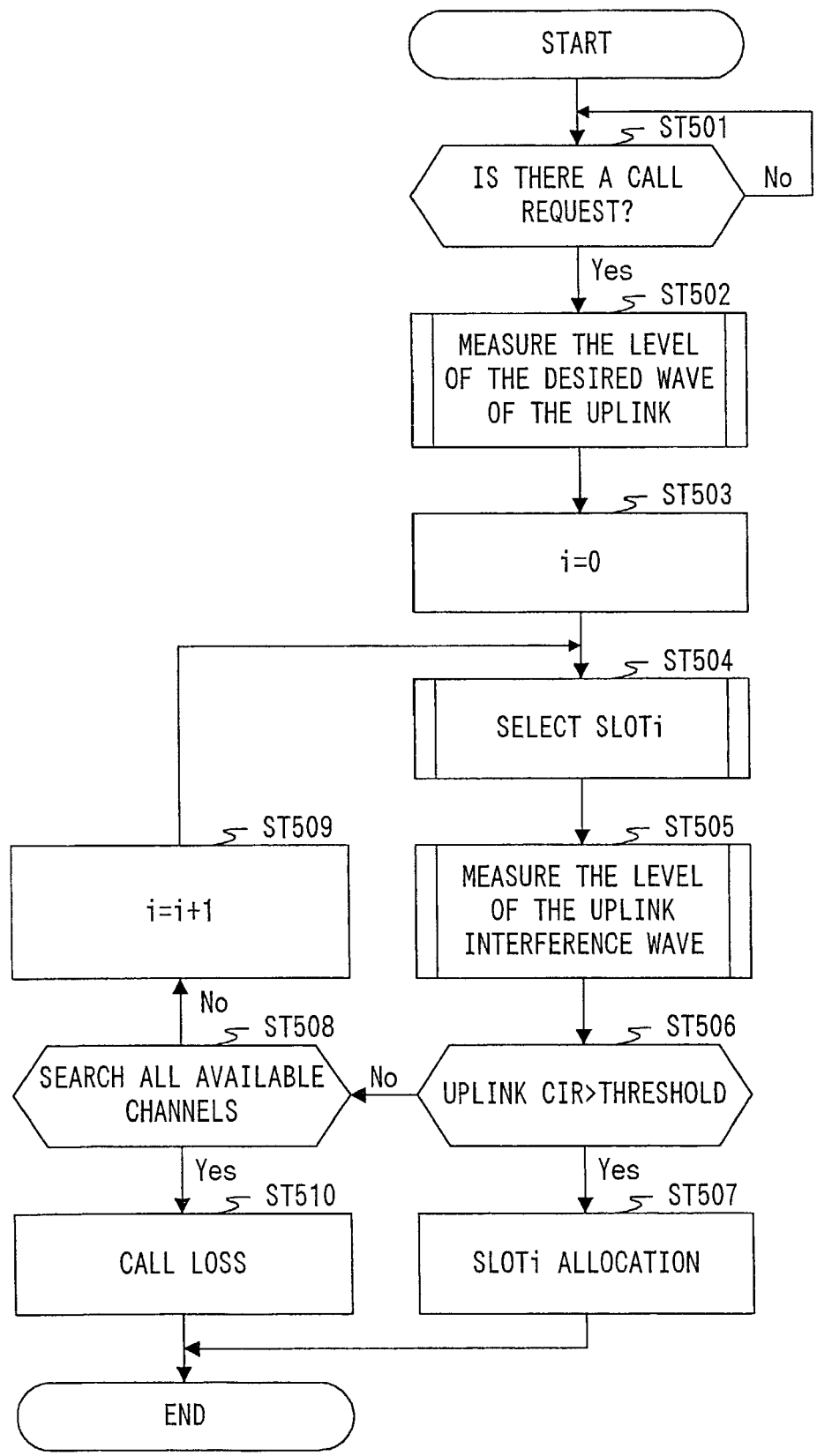
FIG. 7 is a flowchart to explain the channel allocation operation of the uplink of the base station apparatus according to the first embodiment of the present invention.
Figure 8:
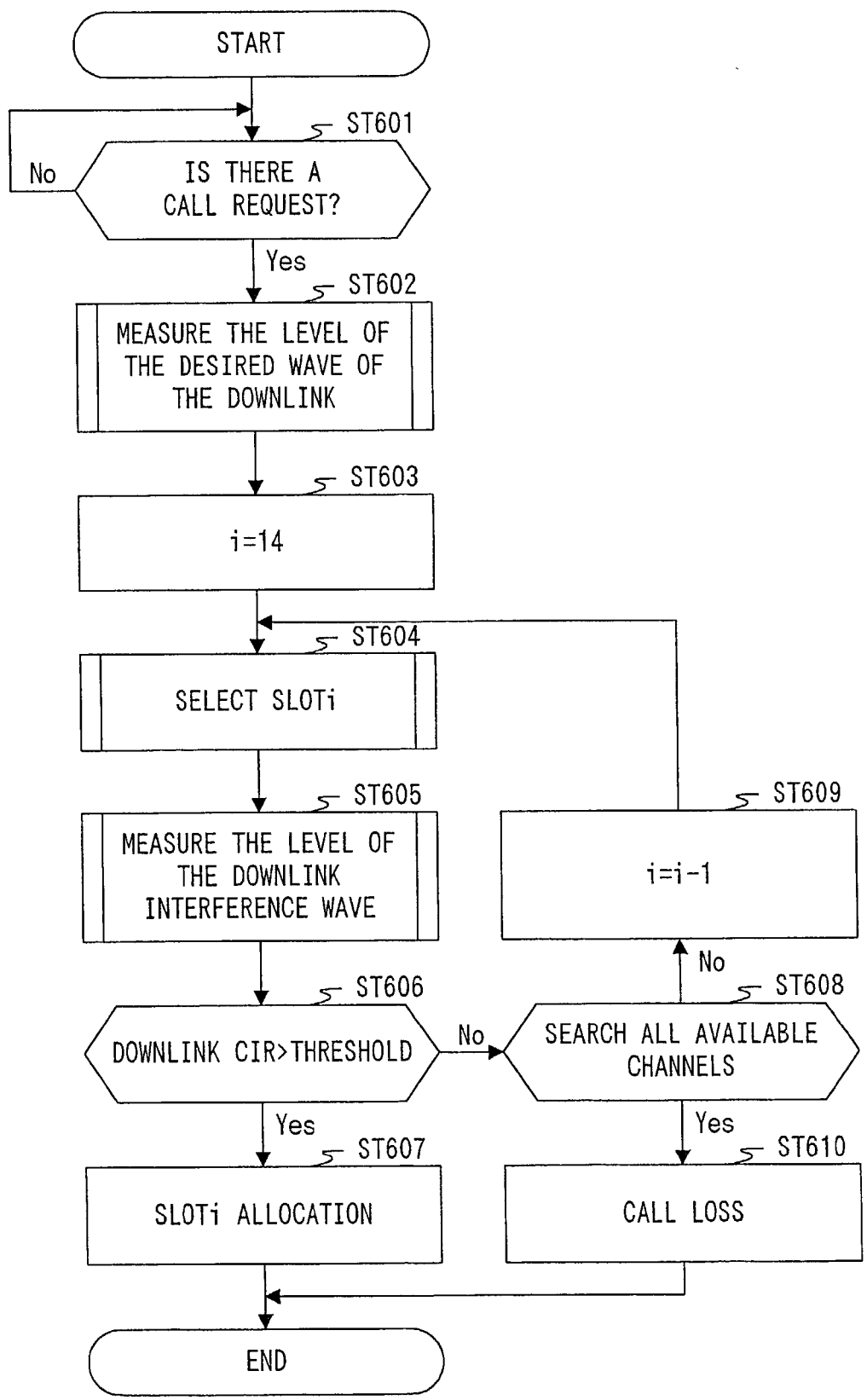
FIG. 8 is a flowchart to explain the channel allocation operation of the downlink of the base station apparatus according to the first embodiment of the present invention.

Channel allocation operation of the base station apparatus illustrated in the above FIG. 3 will be next explained using FIG. 7 and FIG. 8.

FIG. 7 is a flowchart to explain the channel allocation operation of the uplink according to the embodiments of the present invention. FIG. 8 is a flowchart to explain the channel allocation operation of the downlink according to the embodiments of the present invention. Also, the order of priority of FIG. 6 shall apply to FIG. 7 and FIG. 8.

In FIG. 7, when a call request is made from the cellular station apparatus at ST501, reception power measurement section 111 measures the reception power of the desired wave of the uplink at ST502.

In addition, at ST503 and ST504, channel allocation section 114 selects time slot #0 with the highest priority for the uplink, according to the order of priority illustrated in FIG. 6.

Next, at ST505, reception power measurement section 111 measures the reception power of the interference wave for time slot #0 of the uplink, and CIR calculation section 112 calculates CIR.

Then, at ST506, channel allocation section 114 compares the CIR of time slot #0 of the uplink with the predetermined threshold (the so-called channel search.) If the CIR of time slot #0 of the uplink is larger than the threshold, channel allocation section 114 will allocate the call to time slot #0 at ST507. In contrast, if the CIR of time slot #0 of the uplink is less than the threshold, channel allocation section 114 will select time slot #1 with the second highest priority at ST508, ST509 and ST504. Time slot #1 is then processed at ST505 and ST506.

Hereafter, processing from ST504 to ST509 is repeated until the time slot with an uplink CIR larger than the threshold is found. Then, if the CIR of the uplink is below the threshold in all time slots, the base station apparatus will complete processing as call loss at ST510.

Meanwhile, in FIG. 8, when a call request is made at ST601, separation section 110 obtains information about the reception power of the desired wave of the downlink at ST602.

Also, at ST603 and St604, channel allocation section 114 selects time slot #14 with the highest priority for the downlink, according to the order of priority illustrated in FIG. 6.

Next, at ST605, separation section 110 obtains information about the reception power of the interference wave for time slot #14 of the downlink, and CIR calculation section 112 calculates the CIR.

Then, at ST606, channel allocation section 114 compares the CIR of time slot #14 of the downlink with the predetermined threshold (the so-called channel search.)

If the CIR of time slot #14 of the downlink is larger than the threshold, channel allocation section 114 will allocate the call to time slot #14 at ST607. On the other hand, if the CIR of time slot #14 of the downlink is less than the threshold, channel allocation section 114 will select time slot #13 with the second highest priority at ST608, ST609 and ST604. Then, time slot #13 is processed at ST605 and ST606.

Hereafter, processing from ST604 to ST609 is repeated sequentially until a time slot with a downlink CIR exceeding the threshold is found. Then, if the CIR of the downlink is below the threshold in all time slots, the base station apparatus will complete processing as call loss at ST610.

As described, by reversing the order of priority of the uplink to that of the downlink, it is unlikely that uplink/downlink to be allocated to each time slot will differ depending on the cell. It is thereby to perform reuse partitioning in the case of applying ARP to asymmetrical data communications.

(Second Embodiment)

The second embodiment applies to performing open loop transmission power control in an uplink, that is, at a cellular station apparatus using a TDD system. In the case of performing open loop transmission power control for an uplink, the cellular station apparatus measures the reception power of the known signals accumulated in the downlink report channel. In addition, the base station apparatus reports information about transmission power of the report channel, so the cellular station apparatus estimates the transmission path loss by obtaining said information and subtracting reception power from the transmission power. Since the uplink carrier and downlink carrier are identical with a TDD system, the cellular station apparatus transmits signals with a power adding transmission path loss to the target reception power, and it is possible for the base station apparatus to receive signals with optimal power.

However, since communication quality is subject to changes by the minute for reasons such as changes in the cellular station apparatus, when open loop transmission power control is implemented, it is preferable that the slot of the report channel and the slot of the uplink are close in time.

Thus, according to the embodiments of the present invention, the order of priority of an uplink is specified to perform a channel search for an uplink sequentially from a time slot immediately after the report channel. In addition, the order of priority of a downlink is specified to perform a channel search in reverse order to the uplink, starting with a slot before the slot of the report channel and closer in time. In this embodiment of the present invention, the configurations of the base station apparatus and cellular station apparatus are the same as in FIG. 3 and FIG. 4 described in the above first embodiment of the present invention, and the explanations are omitted.

FIG. 9 is a diagram illustrating one example of the order of priority of the uplink and downlink according to the embodiments of the present invention. In FIG. 9, assuming that the report channel is assigned time slot #7, with the order of priority of the uplink, time slot #8 has the highest priority, and subsequently up to time slot #14, as the slot number increases, the order of priority becomes lower. Further, from time slot #0 to time slot #6, as the slot number increases, the order of priority becomes lower. On the other hand, with the order of priority of the downlink, time slot #6 has the highest priority, and subsequently up to time slot #0, as the slot number decreases, the order of priority becomes lower. Further, from time slot #14 to time slot #8, as the slot number decreases, the order of priority becomes lower.

Figure 10:
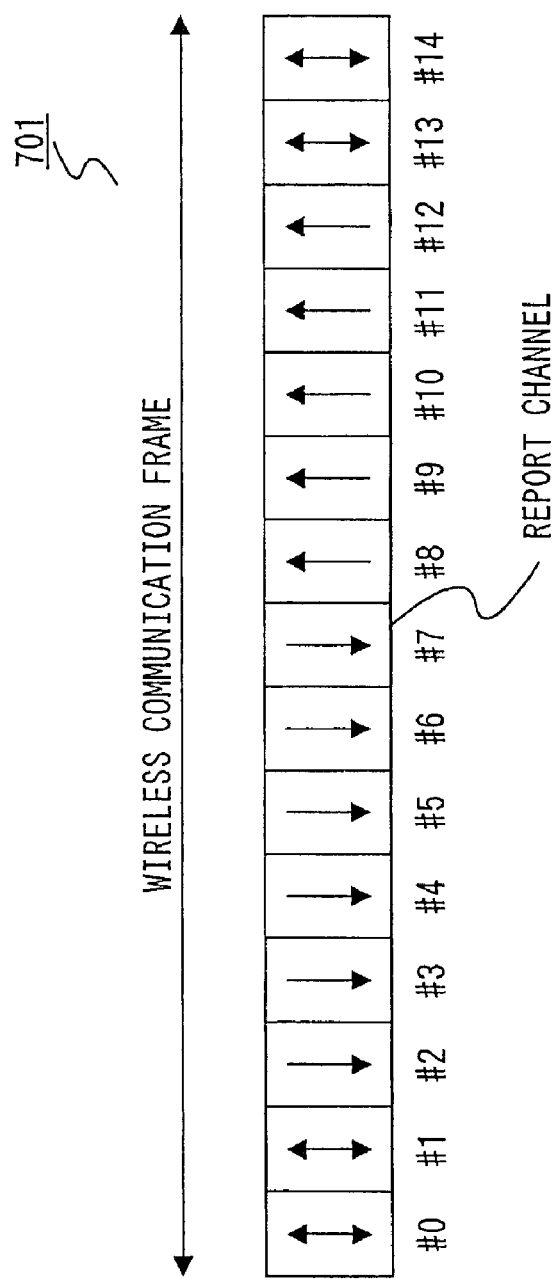
FIG. 10 is a diagram to explain a frame configuration of asymmetrical data communications according to the second embodiment of the present invention.

FIG. 10 is a diagram to explain a frame configuration of asymmetrical data communications according to the embodiments of the present invention, and it shows the state after a call is allocated. In FIG. 10, with wireless frame 701, the report channel is assigned time slot #7, the uplink is assigned time slot #8 to #12, the downlink is assigned time slot #2 to #6, and neither link is assigned other time slots.

If channel allocation is implemented according to the order of priority in FIG. 9 above, as illustrated in FIG. 10, in wireless frame 701, the uplink and the downlink are allocated separately, divided by time slot #7 assigned to the report channel.

Thus, by reversing the order of priority of the uplink to that of the downlink, using the slot assigned the report channel as a base, open loop transmission power control can be taken into account in addition to the effect of a first embodiment of the present invention.

As described above, according to the present invention, it is possible to perform reuse partitioning in the case of applying ARP to asymmetrical data communications, and further, open loop transmission power control can be taken into account.

This application is based on Japanese Patent Application No. 2000-188350 filed on Jun. 22, 2000, the entire content of which is expressly incorporated by reference herein.

INDUSTRIAL APPLICABILITY

The present invention is suitable for the base station apparatuses used for a micro cell mobile communication system utilizing Autonomous Reuse Partitioning Dynamic Channel Allocation Method.

What is claimed is:

1. A base station apparatus that allocates channels to time slots by an autonomous reuse partitioning dynamic channel allocation method, the apparatus comprising:
    a channel allocator that performs: (1) a channel search for an uplink according to a predetermined order of priority, (2) a channel search for a downlink according to an order of priority reverse to said predetermined order of priority for the uplink, and (3) a channel allocation for the uplink and downlink in accordance with results of the uplink and downlink channel searches;
    a receiver that receives signals through the allocated uplink channel; and
    a transmitter that transmits signals through the allocated downlink channel, wherein:
    the base station apparatus is used in a TDD mobile communication system, and
    the channel allocator performs the channel search for the uplink sequentially from a slot that is placed after a slot assigned to a report channel and close in time.

2. A channel allocation method for an autonomous reuse partitioning dynamic channel allocation system, the method comprising:
    performing a channel search for an uplink according to a predetermined order of priority;
    performing a channel search for a downlink according to an order of priority reverse to said predetermined order of priority for the uplink; and
    allocating a channel for the uplink and downlink in accordance with results of the uplink and downlink channel searches, wherein:
    the method is used in a TDD mobile communication system, and
    the channel search for the uplink is performed sequentially from a slot that is placed after a slot assigned to a report channel and close in time.

* * * * *